No. 870,159.
PATENTED NOV. 5, 1907.
C. H. DENT.
BELT SHIFTER FOR MOTOR VEHICLES.
APPLICATION FILED APR. 16, 1906.
4 SHEETS—SHEET 1.
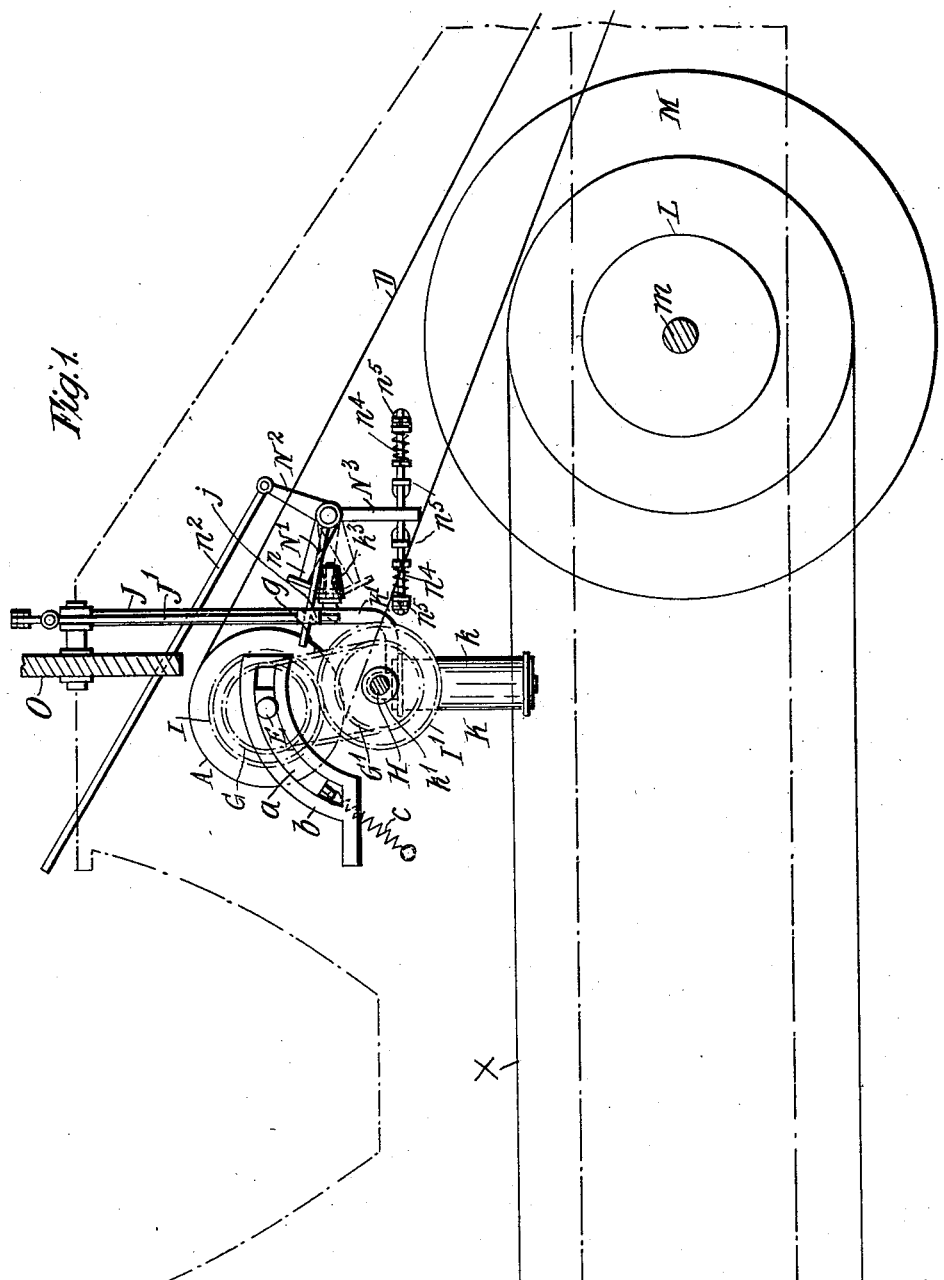

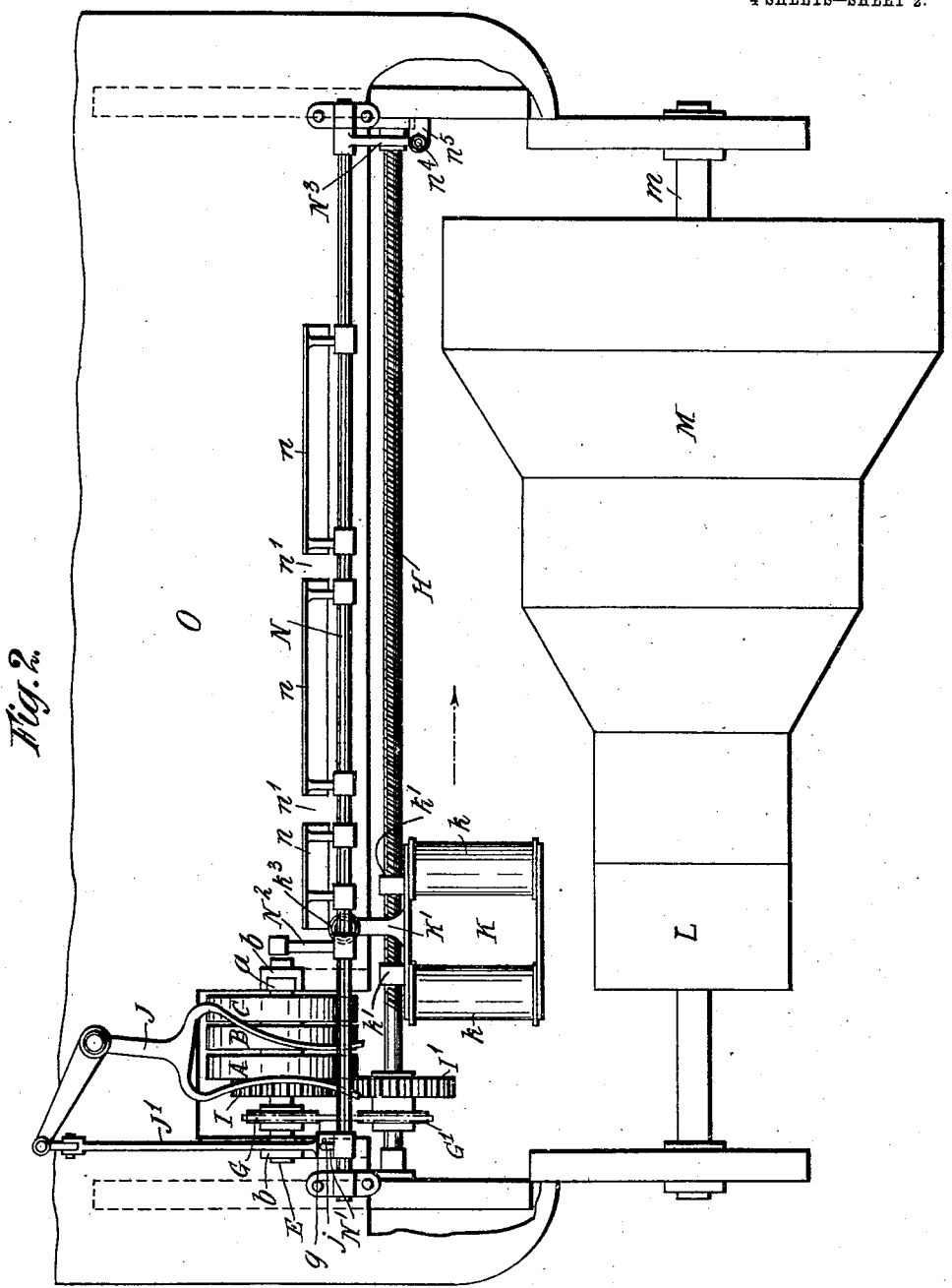

No. 870,159. PATENTED NOV. 5, 1907.
C. H. DENT.
BELT SHIFTER FOR MOTOR VEHICLES.
APPLICATION FILED APR. 16, 1906.
4 SHEETS—SHEET 3.
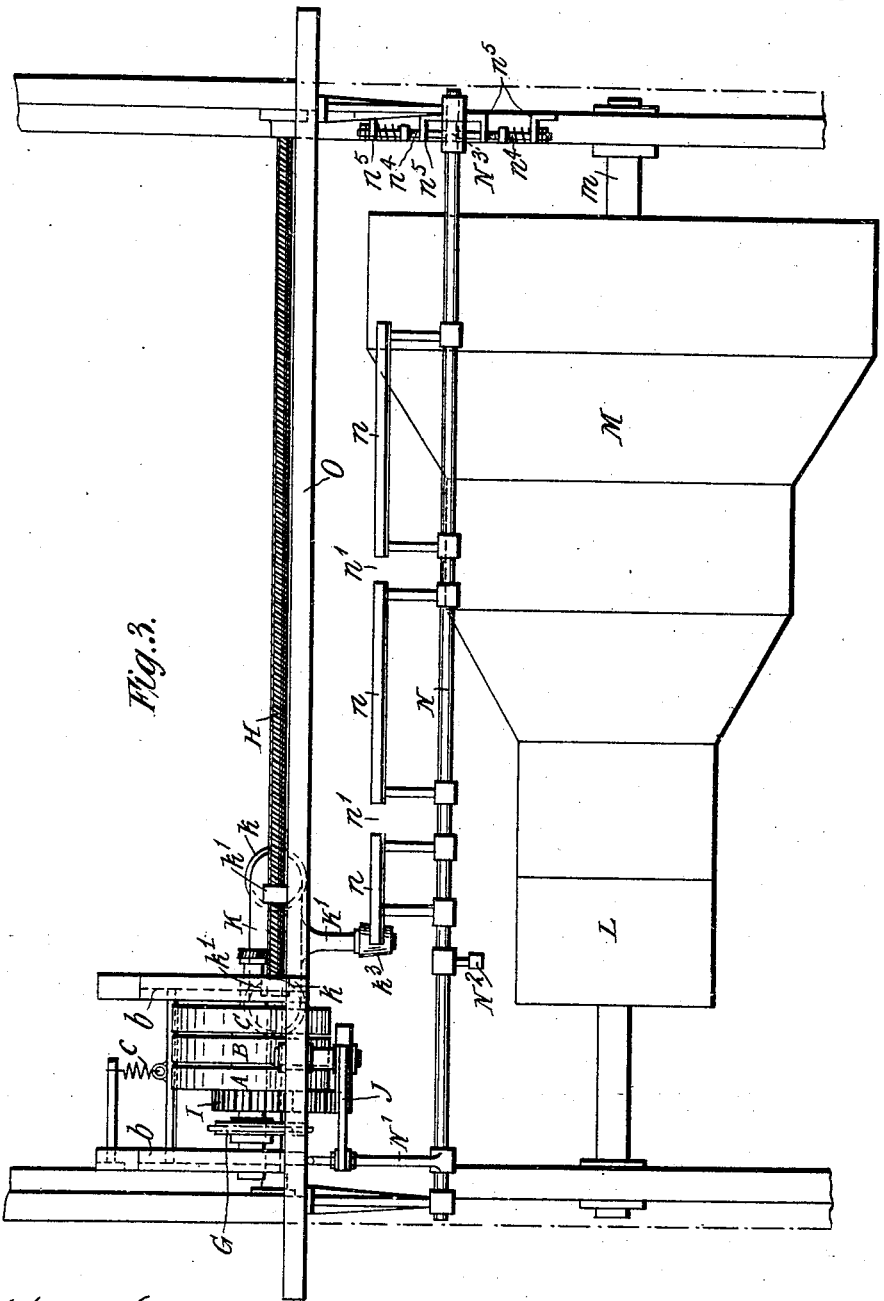

No. 870,159. PATENTED NOV. 5, 1907.
C. H. DENT.
BELT SHIFTER FOR MOTOR VEHICLES.
APPLICATION FILED APR. 16, 1906.
4 SHEETS—SHEET 4.
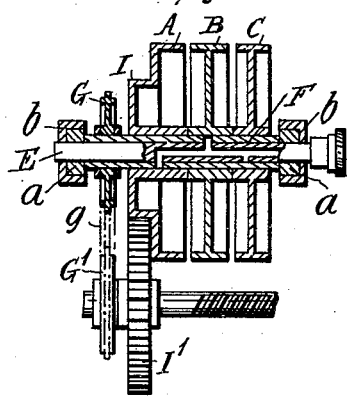
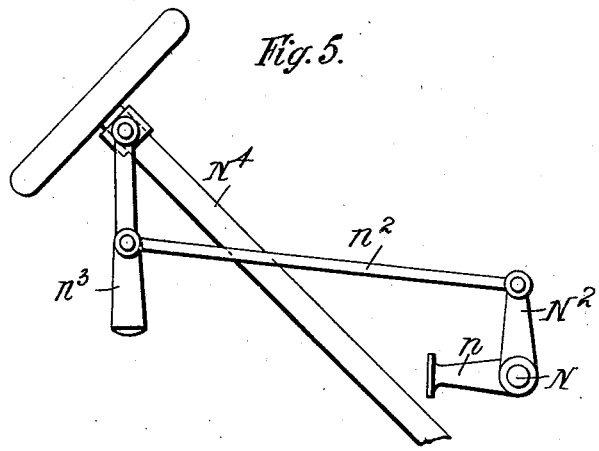

UNITED STATES PATENT OFFICE.

CHARLES HENRY DENT, OF TAMWORTH, ENGLAND.

BELT-SHIFTER FOR MOTOR-VEHICLES.

No. 870,159.  Specification of Letters Patent.  Patented Nov. 5, 1907.

Application filed April 16, 1906. Serial No. 312,021.

*To all whom it may concern:*

Be it known that I, CHARLES HENRY DENT, a subject of the King of Great Britain and Ireland, and residing at Tamworth, Warwickshire, England, have invented new and useful Improvements in Belt-Shifters for Motor-Vehicles, of which the following is a specification.

This invention relates to motor road vehicles or cars and to that class in which the power is transmitted by a belt passing over a pair of oppositely disposed conical pulleys the outer portions of which consist of speed surfaces or races connected by intermediate inclined portions and which are provided with a belt shifter that is traversed by the rotation of a pair of wormed rods or screws adapted to work in unison and to be operated by the motor of the vehicle or car.

According to my present invention I employ on a motor road vehicle or car provided with the above described arrangement of oppositely disposed speed cones, belt shifter and wormed rods or screws, means by which the traverse of said belt shifter is spaced, so that when the movement of same is merely started by the driver the belt shifter will automatically continue to move until the next speed is reached. The above described spacing of the traverse of said belt shifter may be accomplished by the use of a shaft provided with a series of rectangular wings, arms or flaps, separated from one another by intermediate spaces corresponding to the speeds of the pulleys, in conjunction with a horn or horns connected to the front portion or fork of the belt shifter which stops at the intermediate spaces or speeds, or at the sides of the end wings or flaps.

In order that my invention may be understood I have annexed to this specification the accompanying drawings which illustrate the application of my present invention to a motor car, only sufficient of the parts of the car and belt shifter being shown as is necessary for the proper understanding of my present invention.

In these drawings, Figure 1 is a side elevation of a speed spacing mechanism constructed according to my invention. Fig. 2 is a front elevation and Fig. 3 is a plan of said mechanism. Fig. 4 is a section through the three pulleys over which passes the belt that determines the movement of the wormed rods or screws operating the belt shifter, and showing their connection to the gearing by which said rods are moved in either direction. Fig. 5 is an elevation illustrating means that may be employed for rocking the shaft, carrying the rectangular wings, arms or flaps.

A, B and C are three small pulleys over which passes a belt D.

E is a short shaft carrying the pulleys A, B and C, and supported at each end by spring actuated slides hereinafter referred to. The belt D is kept tight by any suitable arrangement such as that shown, where the ends of the shaft E are received in blocks $a$ which slide in quadrant shaped guides $b$ and are pulled towards the lower ends of said guides by means of a spring $c$. But it will be obvious that any other device might be used for imparting the necessary tension to the belt D.

F is a sleeve which is loosely mounted on the shaft E. The center pulley B is loosely mounted on the sleeve F while the pulley C is fixed to the sleeve F to which is also fastened a chain wheel G. The chain wheel G is connected by a chain $g$ to a chain wheel $G^1$ which is fixed to the front wormed rod or screw H of a belt shifter, which is adapted to be connected to and operated by the motor of the car, in the manner hereinafter described. The pulley A is in one with a toothed wheel I, the two being loosely mounted on the sleeve F. The toothed wheel I gears with a toothed wheel $I^1$ fixed to the above named wormed rod or screw H.

J is a fork by means of which the belt D is moved from the center or loose pulley B to either of the pulleys A or C, so as to rotate the wormed rod or screw H, and therefore also the corresponding rod or screw at the other end of the car, in either direction and so traverse the belt shifter in the desired direction. The belt D passes round and receives its motion from a pulley which is driven by the motor of the car and is made at least three times the width of said belt. As will be seen from Figs. 1 and 2, the belt shifter may consist of a fork K provided with a pair of rollers $k$, between which the main driving belt passes, and with a pair of nuts $k^1$, engaging with the wormed rod or screw H, this arrangement or construction of fork, rollers and nuts being connected by a stay or rod to a similar fork at the other end of the car, this duplicate arrangement of parts forming together a belt shifter for the main driving belt X which passes through said shifter and around the front and back stepped cones. The construction of belt shifter as above described forms no novel feature of my present invention and is only referred to herein for the purpose of enabling my said invention to be properly understood.

L is a pulley which is loosely mounted by the side of the front stepped cone M and on the same shaft $m$, and is provided for the purpose of enabling the car to remain stationary. The shaft $m$ is driven from the motor of the car. The fork J is connected by a jointed rod $J^1$ to means actuated by the driver for causing the belt shifter when once started to move the main driving belt on to the next pair of speed surfaces or races of the stepped cones. The means which I have devised and are illustrated by the accompanying drawings consist of a rocking shaft N which is provided with rectangular wings, arms or flaps $n$ and intermediate spaces $n^1$, which latter are arranged so as to be opposite to or correspond with the speed surfaces or races of the stepped cones.

$K^1$ is a horn which is attached to the front roller fork K of the belt shifter and is provided with a friction roller $k^3$. The shaft N carrying the wings or flaps $n$ is provided with three arms $N^1$, $N^2$ and $N^3$. The arm $N^1$ engages, as shown in Fig. 1, with an eye $j$ on the end of the jointed rod $J^1$. The arm $N^2$ is connected, as shown by Figs. 1 and 5, by means of a link $n^2$ to a pivoted lever $n^3$, within easy reach of the driver, which lever may for instance be carried by the steering column $N^4$ of the car, but in lieu of this arrangement any other equivalent device could be used. The arm $N^3$ is provided with any suitable controlling means for returning the shaft $N$ and the rectangular wings or flaps carried thereby to their normal or inoperative positions. In the accompanying drawings said controlling means are shown as consisting of spring rods or plungers $n^4$ adapted to move within brackets $n^5$ and to press at their forward ends against the lower part of arm $N^3$. In lieu of the above described controlling means any other equivalent device could be used.

O is the dashboard of the car.

As will be seen from an inspection of Figs. 2 and 3, the horn $K^1$ carried by the front fork K of the belt shifter is shown as commencing its traverse, in the direction of the arrow, under the first rectangular wing or flap.

The action of the above described speed spacing mechanism is as follows: If the driver wishes to start or stop the car or to increase or decrease the speed of same he pulls or pushes the lever $n^3$. This rocks the shaft $N$ and either depresses or raises the wings or flaps $n$, thus leaving the roller $k^3$ of the horn $K^1$ free to move along the lower or upper surface of the neighboring wing or flap towards which it will be moved. From an inspection of the drawings, it will be readily understood that when the wings or flaps are in their raised position the belt D will be on the pulley A and the belt will be traversed in one direction, but when the wings or flaps are in their lowest position the belt D will be on the pulley C and the belt shifter will be traversed in the other direction, while if the wings or flaps are in their intermediate position the belt D will be on the loose pulley B. In operating the mechanism the driver has only to pull or push the lever $n^3$ for the short time needed to allow the center of the roller $k^3$ to get beyond the front edge of the wing or flap towards which it is moving, for the belt shifter will continue to move until the next speed or belt surface of the front stepped cone M, or the loose pulley L is reached, when the controlling means, such as the spring plungers or rods $n^4$, will promptly return the rocking shaft and wings or flaps to their normal or intermediate position, the main driving belt being then retained in the desired position by reason of the roller $k^3$ being located between two wings or flaps or at the side of either of the end wings or flaps.

By the use of a spaced traversing mechanism such as that above described it is impossible for the main driving belt to occupy a position intermediate between the speed surfaces or races, and the driver of the car is independent at night of any form of indicator for showing the position of the driving belt.

Having now described my invention what I claim as new and desire to secure by Letters Patent is as follows:—

1. In a mechanically operated belt-shifting gear for use on a motor vehicle or car driven by a belt passing over two stepped cones, the combination with the driving belt and one of the stepped cones of a belt shifter and means for causing the belt shifter when once started by the driver to traverse the driving belt until the next speed is reached, substantially as and for the purposes described herein.

2. In a mechanically operated belt-shifting gear for use on a motor vehicle or car driven by a belt passing over two stepped cones, the combination with one of the stepped cones of a rocking shaft, a belt shifter, a horn carried by the belt shifter, wings or flaps carried by the rocking shaft and located intermediate between said horn and stepped speed cone, gearing for moving said belt shifter in either direction and means connecting said gearing and rocking shaft, substantially as and for the purposes described herein.

3. In a mechanically operated belt-shifting gear for use on a motor vehicle or car driven by a belt passing over two stepped cones, the combination with a wormed rod or screw and a belt shifter of three pulleys, a belt passing round said pulleys, chain and toothed gearing connecting said pulleys to the wormed rod or screw, a rocking shaft provided with wings or flaps, and a horn carried by said belt shifter and adapted to coöperate with the wings or flaps, substantially as described herein and illustrated by the accompanying drawings.

In testimony whereof I have signed my name to this specification in the presence of two subscribing witnesses.

CHARLES HENRY DENT.

Witnesses:
E. M. WEBB,
J. W. HARDYMAN.